(12) United States Patent
Kato et al.

(10) Patent No.: US 9,628,813 B2
(45) Date of Patent: *Apr. 18, 2017

(54) MOVING PICTURE ENCODING APPARATUS, MOVING PICTURE DECODING APPARATUS, MOVING PICTURE ENCODING METHOD, MOVING PICTURE DECODING METHOD, MOVING PICTURE ENCODING PROGRAM, AND MOVING PICTURE DECODING PROGRAM

(71) Applicant: NTT DOCOMO, INC., Tokyo (JP)

(72) Inventors: Sadaatsu Kato, Yokosuka (JP); Choong Seng Boon, Yokohama (JP); Satoru Adachi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,295

(22) Filed: Sep. 1, 2015

(65) Prior Publication Data
US 2015/0373360 A1 Dec. 24, 2015

Related U.S. Application Data

(63) Continuation of application No. 14/579,302, filed on Dec. 22, 2014, now Pat. No. 9,225,993, which is a (Continued)

(30) Foreign Application Priority Data

May 7, 2003 (JP) .................................. 2003-129333

(51) Int. Cl.
*H04N 7/12* (2006.01)
*H04N 11/02* (2006.01)
(Continued)

(52) U.S. Cl.
CPC ........... *H04N 19/51* (2014.11); *H04N 19/109* (2014.11); *H04N 19/137* (2014.11);
(Continued)

(58) Field of Classification Search
CPC .... H04N 19/51; H04N 19/109; H04N 19/137; H04N 19/172
(Continued)

(56) References Cited

U.S. PATENT DOCUMENTS

| 6,005,980 A | 12/1999 | Eifrig et al. |
| 6,983,018 B1 | 1/2006 | Lin et al. |

(Continued)

FOREIGN PATENT DOCUMENTS

| CN | 1522545 A | 8/2004 |
| EP | 0 535 746 A2 | 4/1993 |

(Continued)

OTHER PUBLICATIONS

T. Wiegand, Draft ISO/IEC 14496-10, Joint Video Team (JVT) of ISO/IEC MPEG and ITU-T VCEG, Draft ITU-T Rec.H.264, the whole book, "Editor's Proposed Draft Text Modifications for Joint Video Specification (ITU-T Rec. H.264/ISO/IEC 14496-10 AVC)", Oct. 9-17, 2002.

(Continued)

*Primary Examiner* — Jeremaiah C Hallenbeck-Huber
(74) *Attorney, Agent, or Firm* — Oblon, McClelland, Maier & Neustadt, L.L.P.

(57) ABSTRACT

An object of the present invention is to increase efficiency of information compression in coding and decoding. A moving picture encoding apparatus 10 of the present invention has a motion vector predicting part for performing, based on a temporal relation among adjacent reference frame images 703*a*, 703*b*, 703*c* referred to for detecting motion vectors of adjacent blocks adjacent to a coding target block, a target (Continued)

reference frame image 702 referred to for detecting a motion vector of the target block, and a target frame image 701 being the frame image of the coding target, or based on time information thereof, a correction of scaling the motion vectors 751a, 751b, 751c of the adjacent blocks on the basis of the target reference frame image 702; and a determination of an optimum predicted motion vector based on the motion vectors of the adjacent blocks; and thereby predicting the optimum predicted motion vector after the correction.

2 Claims, 10 Drawing Sheets

Related U.S. Application Data continuation of application No. 13/412,251, filed on Mar. 5, 2012, now Pat. No. 8,964,846, which is a continuation of application No. 10/840,335, filed on May 7, 2004, now Pat. No. 8,155,193.

(51) Int. Cl.
- H04N 11/04 (2006.01)
- H04N 19/51 (2014.01)
- H04N 19/56 (2014.01)
- H04N 19/52 (2014.01)
- H04N 19/109 (2014.01)
- H04N 19/573 (2014.01)
- H04N 19/172 (2014.01)
- H04N 19/137 (2014.01)
- H04N 19/513 (2014.01)

(52) U.S. Cl.
CPC ......... *H04N 19/172* (2014.11); *H04N 19/513* (2014.11); *H04N 19/52* (2014.11); *H04N 19/56* (2014.11); *H04N 19/573* (2014.11)

(58) Field of Classification Search
USPC .................................................... 375/240.16
See application file for complete search history.

(56) References Cited

U.S. PATENT DOCUMENTS

| 2004/0001546 A1 | 1/2004 | Tourapis et al. |
| 2004/0218674 A1 | 11/2004 | Kondo et al. |

FOREIGN PATENT DOCUMENTS

| EP | 1 377 067 A1 | 1/2004 |
| EP | 1 499 133 A1 | 1/2005 |
| JP | 06-141302 | 5/1994 |
| JP | 2004-023458 | 1/2004 |
| JP | 2004-072712 | 3/2004 |

OTHER PUBLICATIONS

Thomas Wiegand, "Text of Committee Draft of Joint Video Specification (ITU-T Rec. H.264/ ISO/IEC 14496-10 AVC)", JVT, XP-002354346, May 2002, pp. 47-48.

Thomas Wiegand, "Joint Committee Draft (CD) Text of Committee Draft of Joint Video Specification (ITU-T Rec. H.264 ISO/IEC 14496-10AVC)", JVT of ISO/IEC MPEG and ITU-T-VCEG, JVT-C1673rd Meeting: Fairfax. Virginia, USA May 6-10, 2002, pp. i and 46.

Office Action issued Jan. 10, 2012, in Japanese Patent Application No. 2009-185016, filed Aug. 7, 2006 (with English-language Translation).

Office Action dated Oct. 13, 2006 in Chinese Patent Application No. 200410076620.X (with English-language Translation).

Office Action dated Feb. 2, 2007 in Chinese Patent Application No. 200410076620.X (with English-language Translation).

Office Action issued Sep. 17, 2013, in Japanese Patent Application No. 2012-054562 with English translation.

Office Action issued Sep. 30, 2014 in Japanese Patent Application No. P2013-237167 (with English translation).

MOVING PICTURE ENCODING APPARATUS, MOVING PICTURE DECODING APPARATUS, MOVING PICTURE ENCODING METHOD, MOVING PICTURE DECODING METHOD, MOVING PICTURE ENCODING PROGRAM, AND MOVING PICTURE DECODING PROGRAM

CROSS-REFERENCE TO THE RELATED APPLICATIONS

The present continuation application claims the benefit of priority under 35 U.S.C. §120 to application Ser. No. 14/579,302, filed on Dec. 22, 2014, which is a continuation of U.S. application Ser. No. 13/412,251, filed on Mar. 5, 2012, which is a continuation application of U.S. Ser. No. 10/840,335 filed May 7, 2004, and claims priority to Japanese Application No. 2003-129333 filed May 7, 2003. The entire contents of all of the above-listed documents are incorporated herein by reference.

BACKGROUND OF THE INVENTION

Field of the Invention

The present invention relates to a moving picture encoding apparatus, a moving picture decoding apparatus, a moving picture encoding method, a moving picture decoding method, a moving picture encoding program, and a moving picture decoding program.

Related Background Art

An instance of the conventional moving picture encoding system is moving picture encoding apparatus and moving picture decoding apparatus based on the H.264/AVC encoding system (cf. Joint Video Team (JVT) of ISO/IEC MPEG and ITU-VCEG, "Editor's Proposed Draft Text Modifications for Joint Video Specification (ITU-T Rec.H.264|ISO/IEC 14496-10 AVC), Geneva modifications draft 37"). This system is to reduce redundancy existing in temporal directions, by motion compensated interframe prediction, and further reduce redundancy remaining in spatial directions, by orthogonal transformation, thereby implementing information compression of a moving picture (input video signal).

Since the motion compensated interframe prediction in the above system (hereinafter referred to as "INTER prediction mode") allows preparing a plurality of reference frame images for detection of a motion vector, there are cases where motion vectors of previously coded regions around a coding target region are motion compensated using their respective reference frame images different from one another.

For calculating a predicted motion vector for a coding target region, regardless of which reference frame image was used for motion compensation for motion vectors of previously coded regions around the target region, values of those motion vectors are compared and a median thereof is adopted as a motion vector estimate for the coding target region.

SUMMARY OF THE INVENTION

However, in such cases where the surrounding coded regions were motion compensated using the reference frame images different from the reference frame image of the coding target region, the use of medians thereof as a predicted motion vector brings about a problem that the predicted motion vector considerably differs from an actual motion vector because of the difference of reference frames and it results in decreasing the efficiency of information compression in coding. In conjunction therewith, there also arises another problem of decreasing the efficiency of information compression in decoding at the same time.

The present invention has been accomplished in order to solve the above problems and an object of the invention is to provide a moving picture encoding apparatus, a moving picture decoding apparatus, a moving picture encoding method, a moving picture decoding method, a moving picture encoding program, and a moving picture decoding program capable of increasing the efficiency of information compression in coding and decoding.

A moving picture encoding apparatus according to the present invention is a moving picture encoding apparatus for dividing a frame image as a coding target in a moving picture signal consisting of a temporal series of frame image signals, into a plurality of target regions, detecting motion vectors for the respective target regions with reference to a plurality of frame images different from the frame image as the coding target, and thereby performing coding based on motion compensation, the moving picture encoding apparatus comprising: motion vector predicting means for performing; based on a temporal relation among an adjacent reference frame image referred to for detecting a motion vector of an adjacent region adjacent to a target region, a target reference frame image referred to for detecting a motion vector of the target region, and a target frame image being the frame image as the coding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicting the optimum predicted motion vector after the correction.

A moving picture encoding method according to the present invention is a moving picture encoding method of dividing a frame image as a coding target in a moving picture signal consisting of a temporal series of frame image signals, into a plurality of target regions, detecting motion vectors for the respective target regions with reference to a plurality of frame images different from the frame image as the coding target, and thereby performing coding based on motion compensation, the moving picture encoding method comprising: a motion vector predicting step wherein motion vector predicting means performs; based on a temporal relation among an adjacent reference frame image referred to for detecting a motion vector of an adjacent region adjacent to a target region, a target reference frame image referred to for detecting a motion vector of the target region, and a target frame image being the frame image as the coding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicts the optimum predicted motion vector after the correction.

A moving picture encoding program according to the present invention is a moving picture encoding program for letting a computer execute a coding process of dividing a frame image as a coding target in a moving picture signal consisting of a temporal series of frame image signals, into a plurality of target regions, detecting motion vectors for the respective target regions with reference to a plurality of frame images different from the frame image as the coding target, and thereby performing coding based on motion compensation, wherein the computer is made to function as motion vector predicting means for performing; based on a temporal relation among an adjacent reference frame image referred to for detecting a motion vector of an adjacent region adjacent to a target region, a target reference frame image referred to for detecting a motion vector of the target region, and a target frame image being the frame image as the coding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicting the optimum predicted motion vector after the correction.

According to the moving picture encoding apparatus, moving picture encoding method, and moving picture encoding program of the present invention, the motion vector predicting means performs the correction of scaling the motion vector of the adjacent region on the basis of a time difference between the frame image referred to for detecting the motion vector of the target region and the frame image as the coding target and predicts the optimum predicted motion vector based on the motion vector of the adjacent region; therefore, the predicted motion vector is determined in consideration of temporal continuity of motion, whereby it is feasible to further decrease the difference between the actual motion vector of the target region and the predicted motion vector.

In the moving picture encoding apparatus of the present invention, preferably, the motion vector predicting means corrects to scale each of motion vectors of adjacent regions on the basis of the target reference frame image, based on the temporal relation among the adjacent reference frame image, the target reference frame image, and the target frame image, or based on the time information thereof, and determines the optimum predicted motion vector based on the corrected motion vectors of the adjacent regions. In this manner, the motion vector predicting means corrects to scale each of the motion vectors of the adjacent regions on the basis of the time difference between the frame image referred to for detecting the motion vector of the target region and the frame image as the coding target, and thereafter determines the optimum predicted motion vector based on the corrected motion vectors of the adjacent regions, whereby it is feasible to further decrease the difference between the actual motion vector of the target region and the predicted motion vector.

In the moving picture encoding apparatus of the present invention, preferably, the motion vector predicting means determines the optimum predicted motion vector based on the motion vector of the adjacent region and corrects to scale the optimum predicted motion vector on the basis of the target reference frame image, based on a temporal relation among an adjacent reference frame image of a motion vector of an adjacent region determined as the optimum predicted motion vector, the target reference frame image, and the target frame image, or based on time information thereof. In this case, the motion vector predicting means first determines the optimum predicted motion vector based on the motion vector of the adjacent region and thereafter corrects to scale the determined, optimum predicted motion vector on the basis of the time difference between the frame image referred to for detecting the motion vector of the target region and the frame image as the coding target; therefore, it is feasible to further decrease the difference between the actual motion vector of the target region and the predicted motion vector and it also becomes feasible to reduce a processing time for the prediction of the motion vector.

A moving picture decoding apparatus according to the present invention is a moving picture decoding apparatus for dividing a frame image as a decoding target in a moving picture signal consisting of a temporal series of frame image signals, into a plurality of target regions, and utilizing difference information between a predicted motion vector and motion vectors for the respective target regions detected with reference to a plurality of frame images different from the frame image as the decoding target, to perform decoding based on motion compensation, the moving picture decoding apparatus comprising: motion vector predicting means for performing; based on a temporal relation among an adjacent reference frame image referred to for detecting a motion vector of an adjacent region adjacent to a target region, a target reference frame image referred to for detecting a motion vector of the target region, and a target frame image being the frame image as the decoding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicting the optimum predicted motion vector after the correction.

A moving picture decoding method according to the present invention is a moving picture decoding method of dividing a frame image as a decoding target in a moving picture signal consisting of a temporal series of frame image signals, into a plurality of target regions, and utilizing difference information between a predicted motion vector and motion vectors for the respective target regions detected with reference to a plurality of frame images different from the frame image as the decoding target, to perform decoding based on motion compensation, the moving picture decoding method comprising: a motion vector predicting step wherein motion vector predicting means performs; based on a temporal relation among an adjacent reference frame image referred to for detecting a motion vector of an adjacent region adjacent to a target region, a target reference frame image referred to for detecting a motion vector of the target region, and a target frame image being the frame image as the decoding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicts the optimum predicted motion vector after the correction.

A moving picture decoding program of the present invention is a moving picture decoding program for letting a computer execute a decoding process of dividing a frame image as a decoding target in a moving picture signal consisting of a temporal series of frame image signals, into a plurality of target regions, and utilizing difference information between a predicted motion vector and motion vectors for the respective target regions detected with reference to a plurality of frame images different from the frame image as the decoding target, to perform decoding based on motion compensation, wherein the computer is made to function as motion vector predicting means for performing; based on a temporal relation among an adjacent reference frame image referred to for detecting a motion vector of an adjacent region adjacent to a target region, a target reference frame image referred to for detecting a motion vector of the target region, and a target frame image being the frame image as the decoding target, or based on time information thereof, a correction of scaling the motion vector of the adjacent region adjacent to the target region on the basis of the target reference frame image; and a determination of an optimum predicted motion vector based on the motion vector of the adjacent region adjacent to the target region; and thereby predicting the optimum predicted motion vector after the correction.

According to the moving picture decoding apparatus, moving picture decoding method, and moving picture decoding program of the present invention, the motion vector predicting means performs the correction of scaling the motion vector of the adjacent region on the basis of the time difference between the frame image referred to for detecting the motion vector of the target region and the frame image as the coding target and predicts the optimum predicted motion vector based on the motion vector of the adjacent region; therefore, the predicted motion vector is determined in consideration of temporal continuity of motion, whereby it is feasible to further decrease the difference between the actual motion vector of the target region and the predicted motion vector.

In the moving picture decoding apparatus of the present invention, preferably, the motion vector predicting means corrects to scale each of motion vectors of adjacent regions on the basis of the target reference frame image, based on the temporal relation among the adjacent reference frame image, the target reference frame image, and the target frame image, or based on the time information thereof, and determines the optimum predicted motion vector based on the corrected motion vectors of the adjacent regions. In this manner, the motion vector predicting means corrects to scale each of the motion vectors of the adjacent regions on the basis of the time difference between the frame image referred to for detecting the motion vector of the target region and the frame image as the coding target, and thereafter determines the optimum predicted motion vector based on the corrected motion vectors of the adjacent regions, whereby it is feasible to further decrease the difference between the actual motion vector of the target region and the predicted motion vector.

In the moving picture decoding apparatus of the present invention, preferably, the motion vector predicting means determines the optimum predicted motion vector based on the motion vector of the adjacent region and corrects to scale the optimum predicted motion vector on the basis of the target reference frame image, based on a temporal relation among an adjacent reference frame image of a motion vector of an adjacent region determined as the optimum predicted motion vector, the target reference frame image, and the target frame image, or based on time information thereof. In this case, the motion vector predicting means determines the optimum predicted motion vector based on the motion vector of the adjacent region and thereafter corrects to scale the determined, optimum predicted motion vector on the basis of the time difference between the frame image referred to for detecting the motion vector of the target region and the frame image of the coding target, whereby it is feasible to further decrease the difference between the actual motion vector of the target region and the predicted motion vector and it also becomes feasible to reduce the processing time for the prediction of the motion vector.

DESCRIPTION OF THE PREFERRED EMBODIMENTS

The moving picture encoding apparatus and the moving picture decoding apparatus in embodiments of the present invention will be described with reference to the drawings. The same elements will be denoted by the same reference symbols throughout the drawings, without redundant description.

First Embodiment

Figure 1:
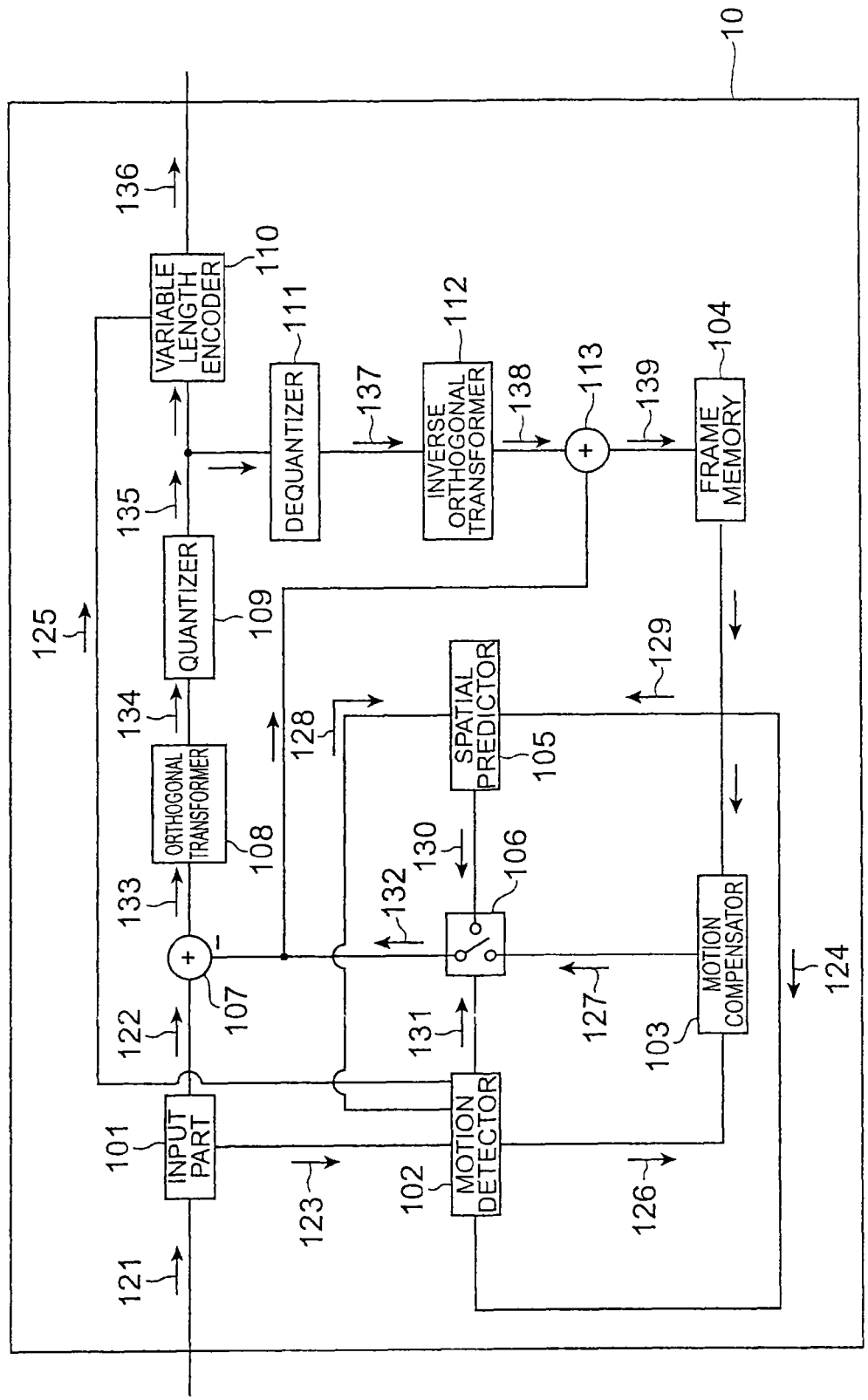
FIG. 1 is a schematic diagram showing an example of the moving picture encoding apparatus in embodiments of the invention.
Figure 3:
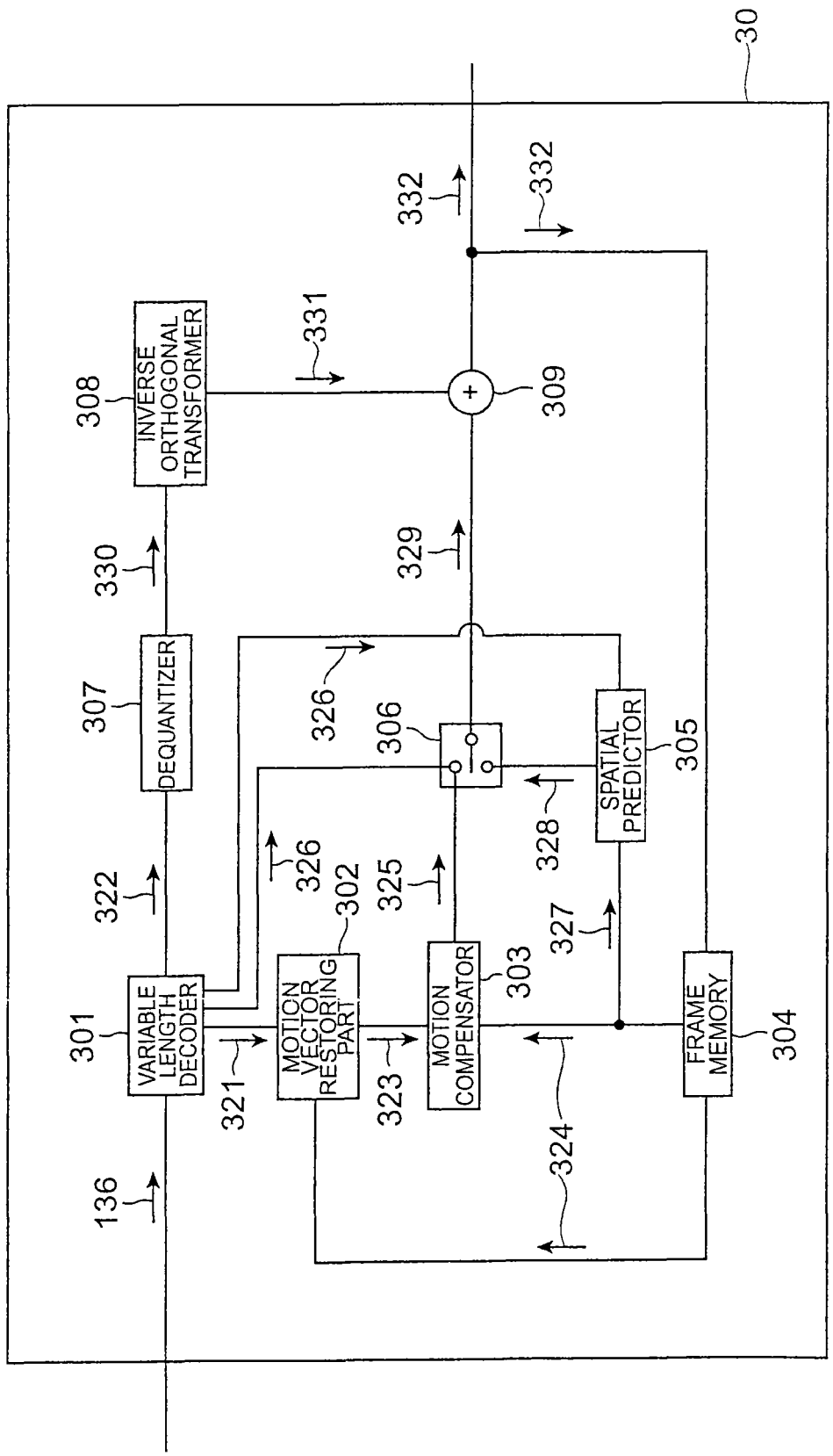
FIG. 3 is a schematic diagram showing an example of the moving picture decoding apparatus in embodiments of the invention.

FIG. 1 is a schematic diagram showing an example of the moving picture encoding apparatus in the present embodiment, and FIG. 3 a schematic diagram showing an example of the moving picture decoding apparatus in the present embodiment.

(Configuration of Moving Picture Encoding Apparatus)

First, the moving picture encoding apparatus 10 according to the present invention will be described, using FIG. 1. The moving picture encoding apparatus 10 described below is an encoding apparatus based on the H.264/AVC encoding system.

Here an input video signal (moving picture signal) as a moving picture signal fed into the moving picture encoding apparatus 10 is comprised of a temporal series of frame images. A frame image signal refers to a signal of a frame image unit in this input video signal. A frame image signal as a coding target will be called below a "current frame." The current frame is divided into macroblocks of square regions fixed in 16 pixels×16 lines, and an encoding process and a decoding process below will be carried out in macroblock units.

In the H.264/AVC encoding system, the following prediction modes are prepared for each of the macroblocks: a plurality of "INTER prediction modes" of detecting a motion vector with reference to a plurality of previously coded frame image signals (reference frame image signals) temporally different from a frame image signal and performing a motion compensated interframe prediction based thereon; and a plurality of "INTRA prediction modes" of performing a spatial prediction using pixel values of neighboring macroblocks previously coded on the same image space. In the "INTER prediction modes," each of motion detection, motion prediction, and motion compensation processes is carried out for each of blocks (target regions) obtained by further segmenting a macroblock into arbitrary regions (e.g., 8 pixels×16 lines) (the details of which will be described later). The moving picture encoding apparatus 10 is configured to switch among the prediction modes in macroblock units according to local properties of the input video signal and to execute efficient information compression.

The moving picture encoding apparatus 10 is constructed of the following functional components as shown in FIG. 1; input part 101, motion detector 102, motion compensator 103, frame memory 104, spatial predictor 105, switch 106, subtracter 107, orthogonal transformer 108, quantizer 109, variable length encoder 110, dequantizer ill, inverse orthogonal transformer 112, and adder 113. Each of the components will be described below.

The input part 101 is a part for receiving an input video signal 121 as a moving picture signal fed from the outside, then decomposing it into frame image signals, and feeding a frame image signal 122 and 123 to the subtracter 107 and to the motion detector 102 respectively.

The frame memory 104 is a part for storing previously coded frame image signals.

The motion detector 102 is a part for performing selection of a prediction mode and detection of a motion vector. More specifically, where an "INTER prediction mode" is selected, the motion detector 102 performs a search using a reference frame image signal 124, to search for an image signal pattern similar to an image signal pattern in the current frame, within a predetermined search range in the plurality of previously coded frame images preliminarily stored in the frame memory. Then it detects a motion vector being a spatial displacement between the two image signal patterns. The motion detector 102 feeds a signal 125 containing a motion vector difference being difference information between the detected motion vector and an optimum predicted motion vector (motion vector estimate) calculated from motion vectors of adjacent blocks previously coded, a reference frame number indicating a reference frame image signal used for the detection of the motion vector, and a prediction mode selected, to the variable length encoder 110. At the same time, the motion detector 102 feeds a signal 126 containing the selected prediction mode, the motion vector, and the reference frame number to the motion compensator 103.

The motion compensator 103 uses the motion vector fed from the motion detector 102, to generate a predictive image signal 127 of each block with reference to a coded image signal (reference frame image signal) of a frame indicated by the reference frame number in the frame memory 104, and then feeds the signal 127 to the switch 106.

On the other hand, where an "INTRA prediction mode" is selected, the motion detector 102 feeds the selected prediction mode 128 to the spatial predictor 105. In this case, the motion detector 102 does not feed the motion vector difference being the information about temporal motion, and the reference frame number to the variable length encoder 110, because a spatial prediction is carried out using pixel values of a neighboring block previously coded on the same image space.

Receiving it, the spatial predictor 105 generates a predictive image signal 130 with reference to an image signal of a neighboring block previously coded (reference frame image signal 129), and feeds the signal 130 to the switch 106.

The switch 106 selects either of the predictive image signal 127 and the predictive image signal 130 in accordance with the prediction mode 131 received from the motion detector 102, and then feeds the selected predictive image signal 132 to the subtracter 107.

Receiving it, the subtracter 107 generates a difference (prediction residual signal 133) between frame image signal 122 and predictive image signal 132, and feeds the signal 133 to the orthogonal transformer 108.

The orthogonal transformer 108 performs an orthogonal transformation of the prediction residual signal 133 fed from the subtracter 107, to generate orthogonal transform coefficients 134, and then feeds the coefficients 134 to the quantizer 109.

Receiving them, the quantizer 109 quantizes the orthogonal transform coefficients 134 fed from the orthogonal transformer 108, to generate quantized orthogonal transform coefficients 135, and then feeds them to the variable length encoder 110 and to the dequantizer 111.

Then the variable length encoder 110 performs entropy coding based on the quantized orthogonal transform coefficients 135 transmitted from the quantizer 109 and based on the prediction mode, motion vector difference, and reference frame number transmitted from the motion detector 102, to multiplex them on a compression stream 136, and then transmits it to the outside.

The dequantizer 111 dequantizes the quantized orthogonal transform coefficients 135 sent from the quantizer 109, to generate orthogonal transform coefficients 137, and then feeds the coefficients 137 to the inverse orthogonal transformer 112.

Then the inverse orthogonal transformer 112 performs an inverse orthogonal transformation of the orthogonal transform coefficients 137 sent from the dequantizer 111, to generate a prediction residual signal 138, and then feeds the signal 138 to the adder 113.

The adder 113 adds up the prediction residual signal 138 sent from the inverse orthogonal transformer 112 and the predictive image signal 132 sent from the switch 106 to generate a frame image signal 139, and then feeds the signal 139 to the frame memory 104. This frame image signal 139 is stored in the frame memory 104 to be used as a reference frame image signal in subsequent encoding processes. The information about the motion vector and the reference frame number is also stored simultaneously as included in the reference frame image signal.

Figure 2:
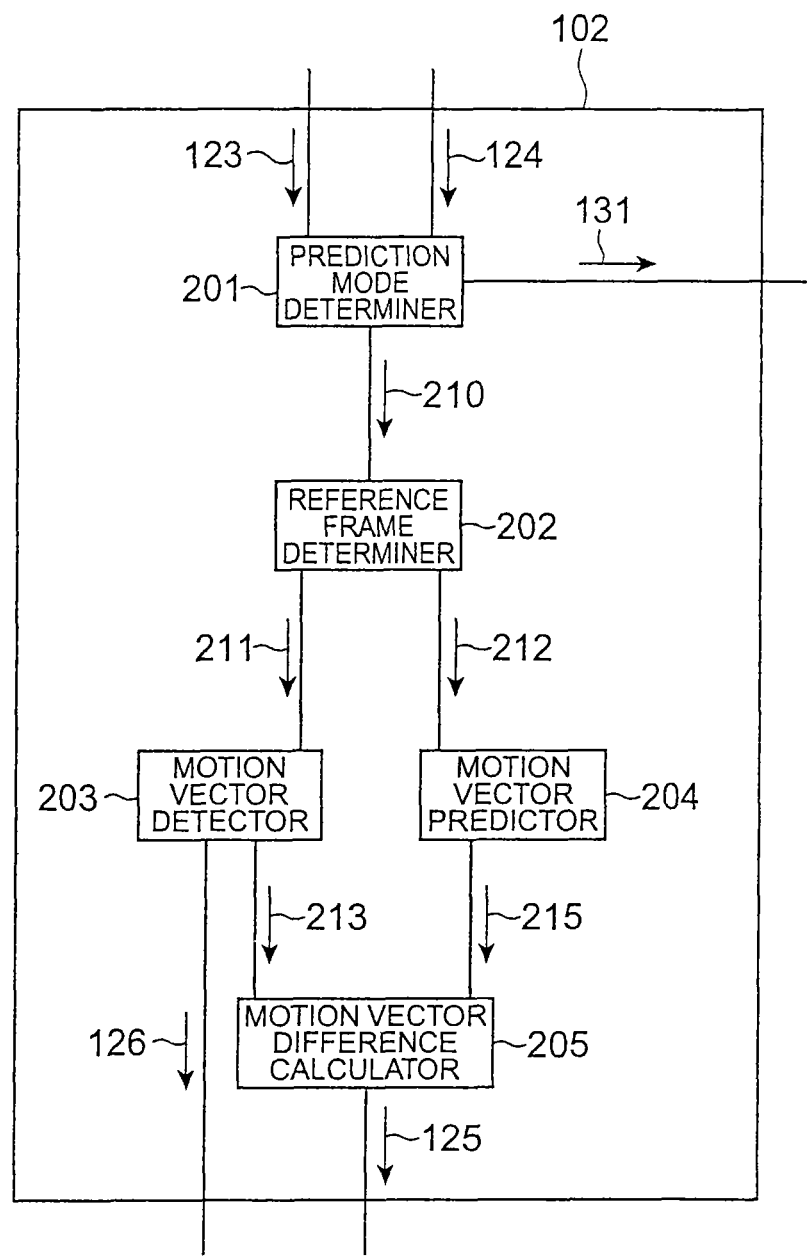
FIG. 2 is a configuration diagram of a motion detecting part shown in FIG. 1.

Next, the motion detector 102 in the moving picture encoding apparatus 10 will be described in detail with reference to FIG. 2. FIG. 2 is a configuration diagram of the motion detector in FIG. 1.

The motion detector 102 is constructed of the following functional components as shown in FIG. 2; prediction mode determiner 201, reference frame determiner 202, motion vector detector 203, motion vector predictor (motion vector predicting means) 204, and motion vector difference calculator 205.

First, the prediction mode determiner 201 determines whether an "INTER prediction mode" or an "INTRA prediction mode" is used as an encoding mode for a predetermined block as a coding target, based on the input frame image signal 123 and reference frame image signal 124, to determine a prediction mode. When an "INTRA prediction mode" is selected, the prediction mode determiner 201 outputs the prediction mode 131 and the processing is terminated. When an "INTER prediction mode" is selected, the prediction mode determiner 201 outputs the prediction mode 131 and simultaneously feeds a signal 210 containing the frame image signal, the reference frame image signal, and the prediction mode, to the reference frame determiner 202.

The reference frame determiner 202 determines a reference frame for detection and prediction of a motion vector of the predetermined block as a coding target, based on the input frame image signal, reference frame image signal, and prediction mode, and feeds a signal 211 containing the frame image signal, reference frame image signal, prediction mode, and a reference frame number, to the motion vector detector 203. At the same time, the reference frame determiner 202 feeds a signal 212 containing the reference frame image signal, prediction mode, and reference frame number, to the motion vector predictor 204.

Based on the input frame image signal, reference frame image signal, prediction mode, and reference frame number, the motion vector detector 203 searches for an image signal pattern similar to an image signal pattern in the current frame, from the image signal indicated by the reference frame number in the reference frame image signal. Then the motion vector detector 203 detects a motion vector being a spatial displacement between the two image signal patterns and feeds a signal 213 containing the motion vector, prediction mode, and reference frame number, to the motion vector difference calculator 205. It also outputs a signal 126 containing the motion vector, prediction mode, and reference frame number to be used for motion compensation.

The motion vector predictor 204 calculates a motion vector estimate of the predetermined block as a coding target, using motion vectors and reference frame numbers of previously coded blocks adjacent to the predetermined block of the coding target, which are included in the reference frame image signal, and using the prediction mode and the reference frame number of the predetermined block of the coding target. For calculating a motion vector estimate, the motion vector predictor 204 performs a correction of scaling a motion vector of a block adjacent to the predetermined block as a coding target on the basis of the frame image (target reference frame image) referred to for detecting the motion vector of the predetermined block as the coding target (the details of which will be described later). The scaling is carried out based on a temporal relation among a frame image (adjacent reference frame image) referred to for detecting a motion vector of an adjacent block, the target reference frame image, and the frame image as a coding target (target frame image). Here the temporal relation among the adjacent reference frame image, target reference frame image, and target frame image indicates relative time differences between the frame images, or time information of the frame images. The motion vector predictor 204 feeds a signal 215 containing the calculated motion vector estimate, the prediction mode, and the reference frame number, to the motion vector difference calculator 205.

The motion vector difference calculator 205 calculates a motion vector difference being the value obtained by subtracting the motion vector estimate from the input motion vector, and outputs a signal 125 containing the prediction mode, reference frame number, and motion vector difference to be subjected to variable length coding.

(Configuration of Moving Picture Decoding Apparatus)

The moving picture decoding apparatus 30 according to the present invention will be described below, using FIG. 3. The moving picture decoding apparatus 30 described below is based on the H.264/AVC encoding system as the moving picture encoding apparatus 10 was.

The moving picture decoding apparatus 30 has a function of using the compression stream 136 from the moving picture encoding apparatus 10 as an input signal to decode it to the input video signal.

The moving picture decoding apparatus 30 is constructed of the following functional components as shown in FIG. 3: variable length decoder 301, motion vector restoring part 302, motion compensator 303, frame memory 304, spatial predictor 305, switch 306, dequantizer 307, inverse orthogonal transformer 308, and adder 309. Each of the components will be described below.

The variable length decoder 301 receives the compression stream 136, then detects a synchronization word indicating a head of each frame, and thereafter restores the prediction mode and quantized orthogonal transform coefficients in block units. Where the prediction mode is an "INTER prediction mode", it also performs decoding of the motion vector difference and the reference frame number. The variable length decoder 301 feeds a signal 321 containing the restored prediction mode, motion vector difference, and reference frame number, to the motion vector restoring part 302. The variable length decoder 301 feeds the restored quantized orthogonal transform coefficients 322, to the dequantizer 307. The variable length decoder 301 feeds the restored prediction mode 326, to the switch 306 and to the spatial predictor 305.

Where the prediction mode is an "INTER prediction mode", the motion vector restoring part 302 restores a motion vector by use of the motion vector difference transmitted from the variable length decoder 301 and a motion vector estimate calculated from motion vectors of adjacent blocks previously decoded. Then it feeds a signal 323 containing the restored motion vector, prediction mode, and reference frame number, to the motion compensator 303.

Then the motion compensator 303 uses a reference frame signal 324 from the frame memory 304 to generate a predictive image signal 325, based on the motion vector, prediction mode, and reference frame number, and then feeds the signal 325 to the switch 306. The frame memory 304 stores frame image signals previously decoded.

Where the prediction mode 326 is an "INTRA prediction mode", the spatial predictor 305 generates a predictive image signal 328 with reference to an image signal (reference frame image signal 327) of a previously decoded neighboring block, and then feeds the signal 328 to the switch 306.

Then the switch 306 selects either of the predictive image signal 325 and the predictive image signal 328 in accordance with the prediction mode 326 sent from the variable length decoder 301, and feeds the selected one as predictive image signal 329 to the adder 309.

On the other hand, the dequantizer 307 dequantizes the quantized orthogonal transform coefficients 322 sent from the variable length decoder 301, to restore orthogonal transform coefficients 330, and feeds them to the inverse orthogonal transformer 308.

The inverse orthogonal transformer 308 performs an inverse orthogonal transformation of the orthogonal transform coefficients 330 to restore a prediction residual signal 331.

Then the adder 309 adds up the predictive image signal 329 sent from the switch 306 and the prediction residual signal 331 sent from the inverse orthogonal transformer 308, to restore a frame image signal 332.

Finally, the frame image signal 332 is outputted at a predetermined display timing to a display device (not shown), to reproduce the input video signal (moving picture signal) 121.

The frame image signal 332 is stored as a reference frame image signal into the frame memory 304 to be used in subsequent decoding processes. Here the frame image signal 332 has the same values as the frame image signal 139 of the same number in the moving picture encoding apparatus 10. The information about the motion vector and reference frame number is also stored simultaneously as included in the reference frame image signal.

Figure 4:
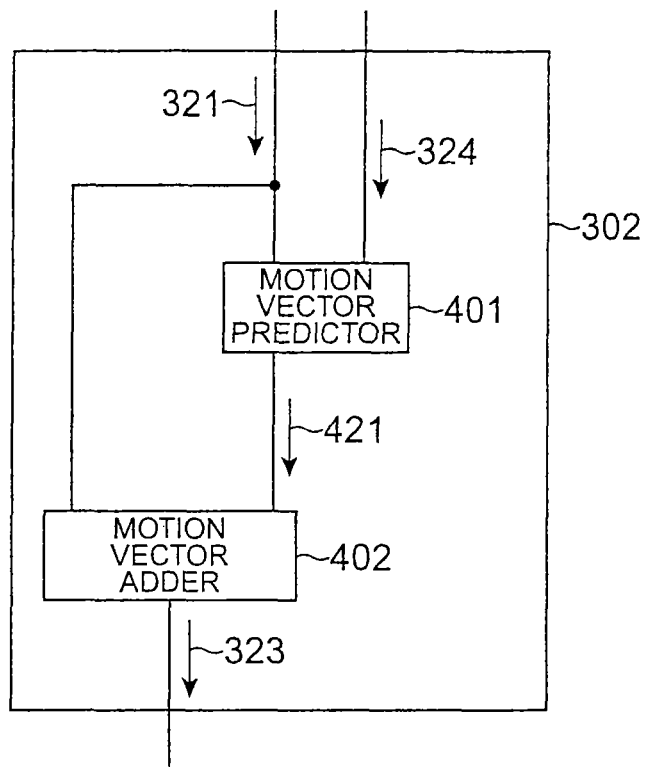
FIG. 4 is a configuration diagram of a motion vector restoring part shown in FIG. 3.

The motion vector restoring part 302 in the moving picture decoding apparatus 30 will be described below in detail with reference to FIG. 4. FIG. 4 is a configuration diagram of the motion vector restoring part in FIG. 3.

First, a motion vector predictor 401 extracts motion vectors and reference frame numbers of previously decoded blocks adjacent to a predetermined block as a decoding target, which are included in the input reference frame image signal 324. Then the motion vector predictor 401 calculates a motion vector estimate for the predetermined block as a decoding target, using the prediction mode and reference frame number of the predetermined block of the decoding target included in the input signal 321. For calculating a motion vector estimate, the motion vector predictor performs a correction of scaling a motion vector of a block adjacent to the predetermined block as a decoding target on the basis of a frame image (target reference frame image) referred to for detecting a motion vector of the predetermined block of the decoding target (the details of which will be described later). The scaling is carried out based on a temporal relation among a frame image (adjacent reference frame image) referred to for detecting a motion vector of an adjacent block, the target reference frame image, and the frame image of the decoding target (target frame image). Here the temporal relation among the adjacent reference frame image, target reference frame image, and target frame image indicates relative time differences between the frame images, or time information of the frame images. Thereafter, the motion vector predictor 401 feeds a signal 421 containing the prediction mode, reference frame number, and calculated motion vector estimate, to motion vector adder 402.

The motion vector adder 402 restores a motion vector, based on the input motion vector estimate, prediction mode, motion vector difference, and reference frame number. Then the motion vector adder 402 outputs a signal 323 containing the motion vector, prediction mode, and reference frame number to be used for motion compensation.

(Calculation of Optimum Predicted Motion Vector)

Now, the calculation of the optimum predicted motion vector, which is carried out in the motion detector 102 of the moving picture encoding apparatus 10 and in the motion vector restoring part 302 of the moving picture decoding apparatus 30, will be further described in more detail.

The motion vector predictor 204 in the motion detector 102 of the moving picture encoding apparatus 10 calculates an optimum predicted motion vector (motion vector estimate) to be used for calculating a difference from a motion vector detected in a block as a coding target. The information finally transmitted as the compression streams 136 by the moving picture encoding apparatus 10 is one obtained by encoding a motion vector difference resulting from subtraction of the motion vector estimate from the motion vector. Accordingly, the closer the optimum predicted motion vector to an actual motion vector, the higher the efficiency of encoding.

The motion vector predictor 401 in the motion vector restoring part 302 of the moving picture decoding apparatus 30 calculates a motion vector estimate, based on the reference frame image signal. The calculated motion vector estimate is added to a transmitted motion vector difference to be used for restoring a motion vector. Therefore, just as in the case of the moving picture encoding apparatus 10, the closer the optimum predicted motion vector to an actual motion vector, the higher the efficiency of decoding.

Since the calculation of the motion vector estimate by the motion vector predictor 204 is a process similar to the calculation of the motion vector estimate by the motion vector predictor 401, only the operation of the motion vector predictor 204 will be described below.

Figure 5:
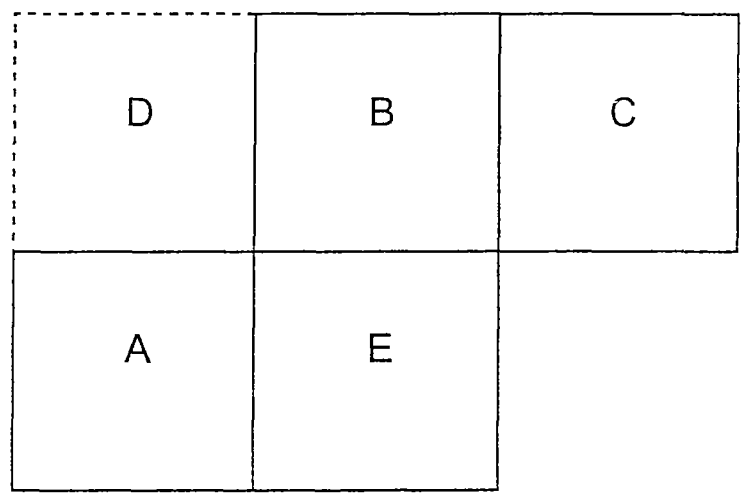
FIG. 5 is an illustration schematically showing a coding target block and adjacent blocks.

FIG. 5 is an illustration schematically showing a block as a coding target and adjacent blocks. In FIG. 5, where the block as a coding target is denoted by E, block A represents a block including the pixel just to the left of the most upper-left pixel in block E, block B represents a block including the pixel just above the most upper-left pixel in block E, and block C represents a block including the pixel just above and to the right of the most upper-right pixel in block E. Furthermore, block D represents a block including the pixel just above and to the left of the most upper-left pixel in block E.

First, where block C is outside the picture, the motion vector predictor 204 assumes that the motion vector and reference frame number of block C are equal to those of block D.

Where block B and block C are both outside the picture, the motion vector and reference frame number of block B and block C are assumed to be equal to those of block A.

Based on the above assumptions, the motion vector predictor 204 ensures that there always exist the motion vectors and reference frame numbers of block A, block B, and block C adjacent to block E as a coding target, and then performs the calculation of the motion vector estimate.

Figure 6:
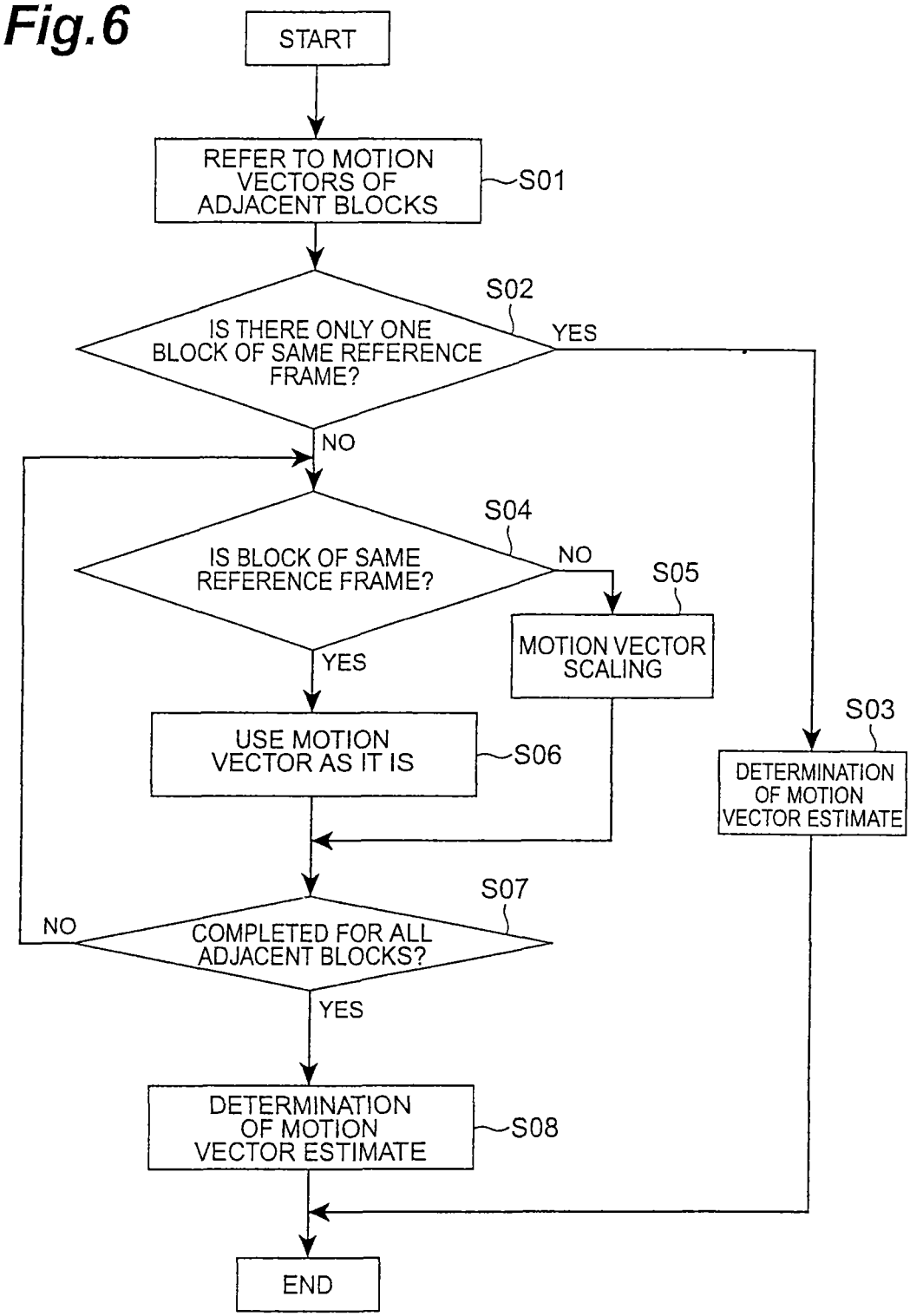
FIG. 6 is a flowchart showing the operation of a motion vector predicting part in a first embodiment.

FIG. 6 is a flowchart showing the operation in the calculation of the motion vector estimate by the motion vector predictor 204.

First, the motion vector predictor 204 refers to the motion vectors and reference frame image numbers of the blocks (A, B, and C) adjacent to the predetermined block (E) as a coding target, included in the reference frame image signal (step S01).

Then the motion vector predictor determines whether only one of the reference frame image numbers of the adjacent blocks (A, B, C) is equal to the reference frame image number of the block (E) (step S02). When only one of the reference frame image numbers of the adjacent blocks (A, B, C) is equal to the reference frame image number of the block (E) (step S02: YES), the motion vector predictor 204 determines values of a motion vector of the block having the reference frame image number equal to that of the block (E), as a motion vector estimate for the block (E) (step S03). When it is not the case that only one of the reference frame image numbers of the adjacent blocks (A, B, C) is equal to that of block (E) (step S02: NO), the processing is transferred to step S04.

Subsequently, the motion vector predictor 204 determines whether each adjacent block (A, B, or C) is one motion compensated using the reference frame image of the same as the reference frame image number used for detection of the motion vector of the block (E) (step S04). When the reference frame image of the adjacent block (A, B, C) thus detected is not the same as the reference frame image used for detection of the motion vector of the block (E) (step S04: NO), values of a motion vector of the adjacent block (A, B, C) are scaled so as to meet the same reference frame condition for the coding target block (E) (step S05).

Figure 7:
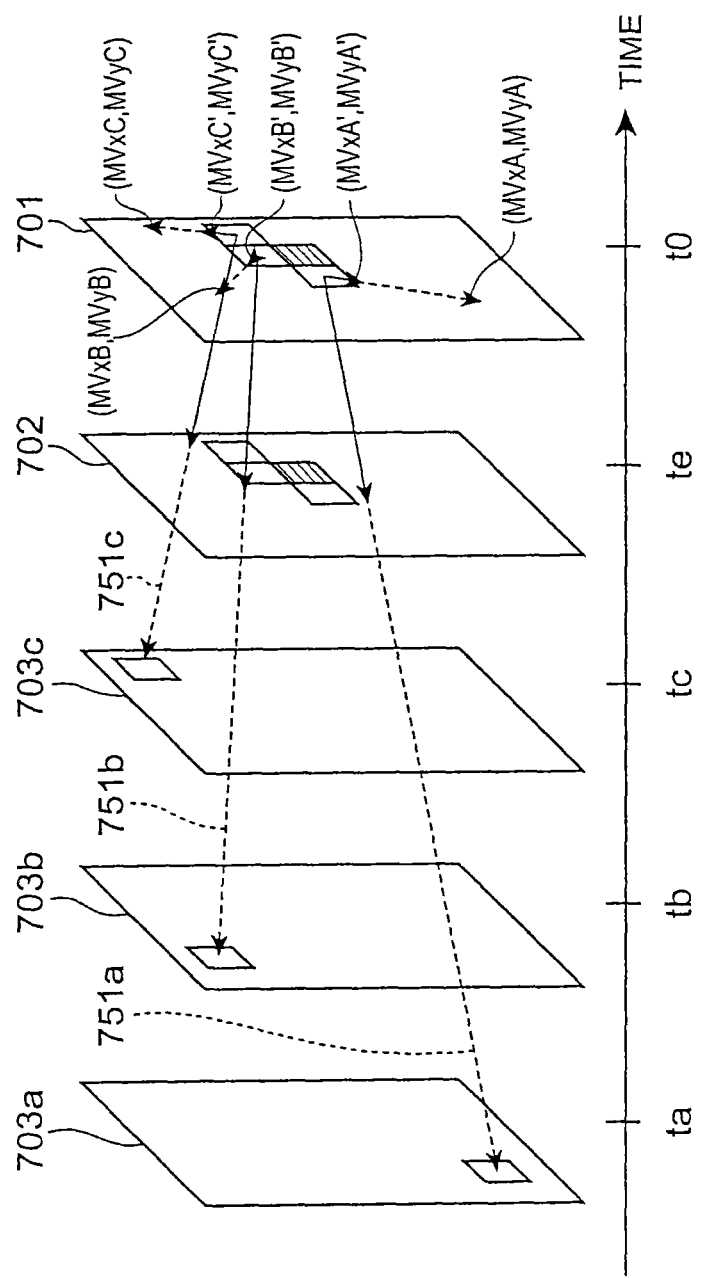
FIG. 7 is an illustration showing motion vectors of a coding target block and adjacent blocks on the temporal domain.

This scaling method will be described on the basis of FIG. 7. FIG. 7 is an illustration showing motion vectors of a coding target block and adjacent blocks on the temporal domain. As shown in FIG. 7, length of motion vectors 751a, 751b, and 751c of the blocks (A, B, C) adjacent to a predetermined block as a coding target detected are modified on the basis of a temporal distance (t0–te) from the current frame (target frame image) 701 (time t0) to a reference frame of the coding target block (E) (target reference frame image) 702. Specifically, supposing the reference frame 702 of the coding target block (E) is one at a time te, the motion vector 751a of the adjacent block A has components (MVxA, MVyA), and the reference frame thereof (adjacent reference frame image) 703a is one at a time ta; a motion vector (MVxA', MVyA') scaled on the basis of the reference frame 702 of the coding target block (E) is determined according to Eqs (1) and (2) below.

$$MVxA' = MVxA \cdot (t0-te)/(t0-ta) \quad (1)$$

$$MVyA' = MVyA \cdot (t0-te)/(t0-ta) \quad (2)$$

In this case, the adjacent blocks (A, B, C) do not necessarily be motion compensated using past reference frame images, but may be motion compensated using future ((t0–ta)<0) reference frame images.

Returning to FIG. 6, when the reference frame image of the adjacent block (A, B, C) detected is the same as that used for detection of the motion vector of the block (E) (step S04: YES) on the other hand, values of the motion vector of the block (A, B, C) are regarded as already scaled, and are used as they are (step S06).

It is then determined whether the scaling is completed for all the motion vectors of the adjacent blocks (A, B, C) (step S07). When the scaling is not completed for all the adjacent blocks (A, B, C) (step S07: NO), the processing from step S04 is repeated.

When the scaling is completed for all the adjacent blocks (A, B, C) (step S07: YES), the median is calculated from the motion vectors of the adjacent blocks (A, B, C) scaled on the basis of the reference frame 702 used for detection of the motion vector of the coding target block (E), to determine an optimum predicted motion vector (step S08). The median is calculated by comparing the scaled motion vectors (MVxA', MVyA'), (MVxB', MVyB'), and (MVxC', MVyC') of the three adjacent blocks (A, B, C) as to each of the x, y components thereof and adopting an intermediate (the second biggest) value among the components as a motion vector estimate. For example, in a case where (MVxA', MVyA')=(3, −5), (MVxB', MVyB')=(−1, 4), and (MVxC', MVyC')=(2, 6), the motion vector estimate (PMVxE, PMVyE) is determined to be (2, 4) consisting of an intermediate (the second biggest) value of the x components and an intermediate (the second biggest) value of the y components.

When the motion vector of the coding target block is predicted using the medians of the motion vectors of the adjacent blocks in this way, the optimum predicted motion vector is considered to become relatively close to an actual motion vector of the coding target block, from the spatial correlation between the coding target block and the blocks around it. This method is called median prediction.

Figure 10:
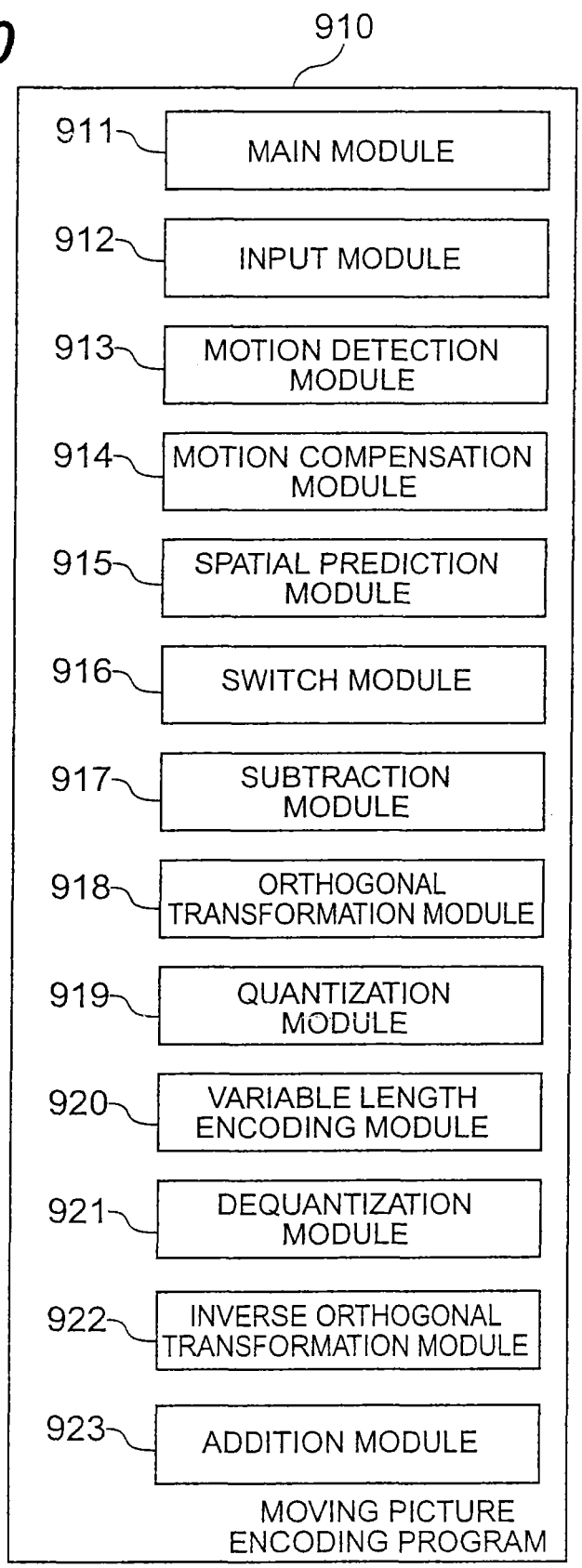
FIG. 10 is an illustration showing a configuration of a moving picture encoding program in embodiments of the invention.
Figure 11:
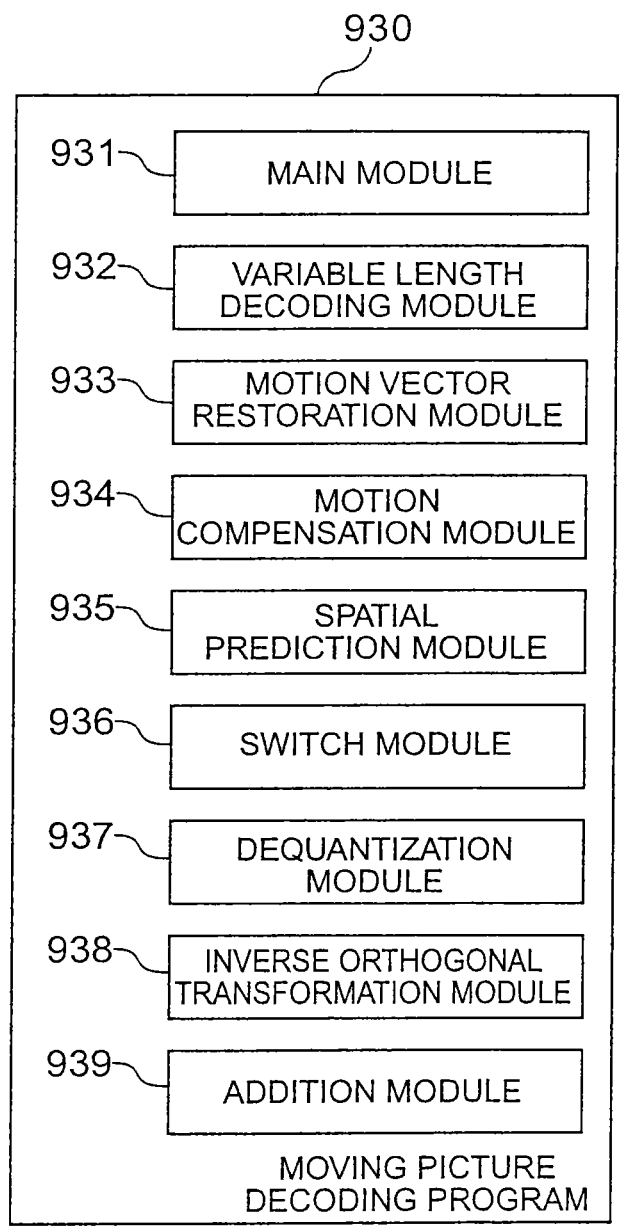
FIG. 11 is an illustration showing a configuration of a moving picture decoding program in embodiments of the invention.

Described below are a moving picture encoding program 910, stored in a computer-readable storage medium, for making a computer function as the aforementioned moving picture encoding apparatus 10 and a moving picture decoding program 930, stored in a computer-readable storage medium, for making a computer function as the aforementioned moving picture decoding apparatus 30. FIG. 10 and FIG. 11 are illustrations showing configurations of the moving picture encoding program 910 and the moving picture decoding program 930, respectively.

As shown in FIG. 10, the moving picture encoding program 910 has main module 911 for totally controlling processing, input module 912, motion detection module 913, motion compensation module 914, spatial prediction module 915, switch module 916, subtraction module 917, orthogonal transformation module 918, quantization module 919, variable length coding module 920, dequantization module 921, inverse orthogonal transformation module 922, and addition module 923. The functions that the computer is made to substantialize by the input module 912, motion detection module 913, motion compensation module 914, spatial prediction module 915, switch module 916, subtraction module 917, orthogonal transformation module 918, quantization module 919, variable length coding module 920, dequantization module 921, inverse orthogonal transformation module 922, and addition module 923 are much the same as the aforementioned input part 101, motion detector 102, motion compensator 103, spatial predictor 105, switch 106, subtracter 107, orthogonal transformer 108, quantizer 109, variable length encoder 110, dequantizer 111, inverse orthogonal transformer 112, and adder 113, respectively.

As shown in FIG. 11, the moving picture decoding program 930 has main module 931 for totally controlling processing, variable length decoding module 932, motion vector restoration module 933, motion compensation module 934, spatial prediction module 935, switch module 936, dequantization module 937, inverse orthogonal transformation module 938, and addition module 939. The functions that the computer is made to substantialize by the variable length decoding module 932, motion vector restoration module 933, motion compensation module 934, spatial prediction module 935, switch module 936, dequantization module 937, inverse orthogonal transformation module 938, and addition module 939 are much the same as the aforementioned variable length decoder 301, motion vector restoring part 302, motion compensator 303, spatial predictor 305, switch 306, dequantizer 307, inverse orthogonal transformer 308, and adder 309, respectively.

In the moving picture encoding apparatus 10 and moving picture decoding apparatus 30 of the first embodiment described above, the motion vector predictor 204 and 401 perform the correction of scaling the motion vectors of the respective adjacent blocks on the basis of the time difference between the frame image referred to for detecting the motion vector of the target block and the frame image as a coding target and thereafter predicts the optimum predicted motion vector based on the corrected motion vectors of the adjacent blocks; therefore, the optimum predicted motion vector is determined in consideration of temporal continuity of motion, whereby it is feasible to further decrease the difference between the actual motion vector of the target block and the optimum predicted motion vector.

Second Embodiment

The second embodiment of the present invention will be described below. Since the fundamental configurations of the moving picture encoding apparatus and moving picture decoding apparatus in the present embodiment are much the same as the configurations of the moving picture encoding apparatus 10 and the moving picture decoding apparatus 30 in the first embodiment, the components will be denoted by the same reference symbols, without description thereof, and only the difference from the first embodiment will be detailed below.

The difference between the moving picture encoding apparatus and moving picture decoding apparatus in the second embodiment, and the moving picture encoding apparatus 10 and moving picture decoding apparatus 30 in the first embodiment, is the part associated with the calculation of the motion vector estimate. Described below is the calculation of the estimated motion vector executed in the motion detector 102 of the moving picture encoding apparatus 10 and in the motion vector restoring part 302 of the moving picture decoding apparatus 30, which is different from that in the first embodiment.

Since the calculation of the motion vector estimate by the motion vector predictor 401 is a process similar to the calculation of the motion vector estimate by the motion vector predictor 204, only the operation of the motion vector predictor 204 will be described below.

In the calculation of the motion vector estimate by the motion vector predictor 204 in the present embodiment, the motion vector predictor 204 does not perform the process of preliminarily scaling a motion vector of each adjacent block on the basis of the target reference frame and determining the optimum predicted motion vector based on the motion vectors after the scaling. Instead, the motion vector predictor 204 first determines an optimum motion vector to be used for prediction of a motion vector, based on the motion vectors of the respective adjacent blocks before scaling, and then corrects to scale estimated values of the motion vector determined, on the basis of the target reference frame to obtain a motion vector estimate.

Figure 8:
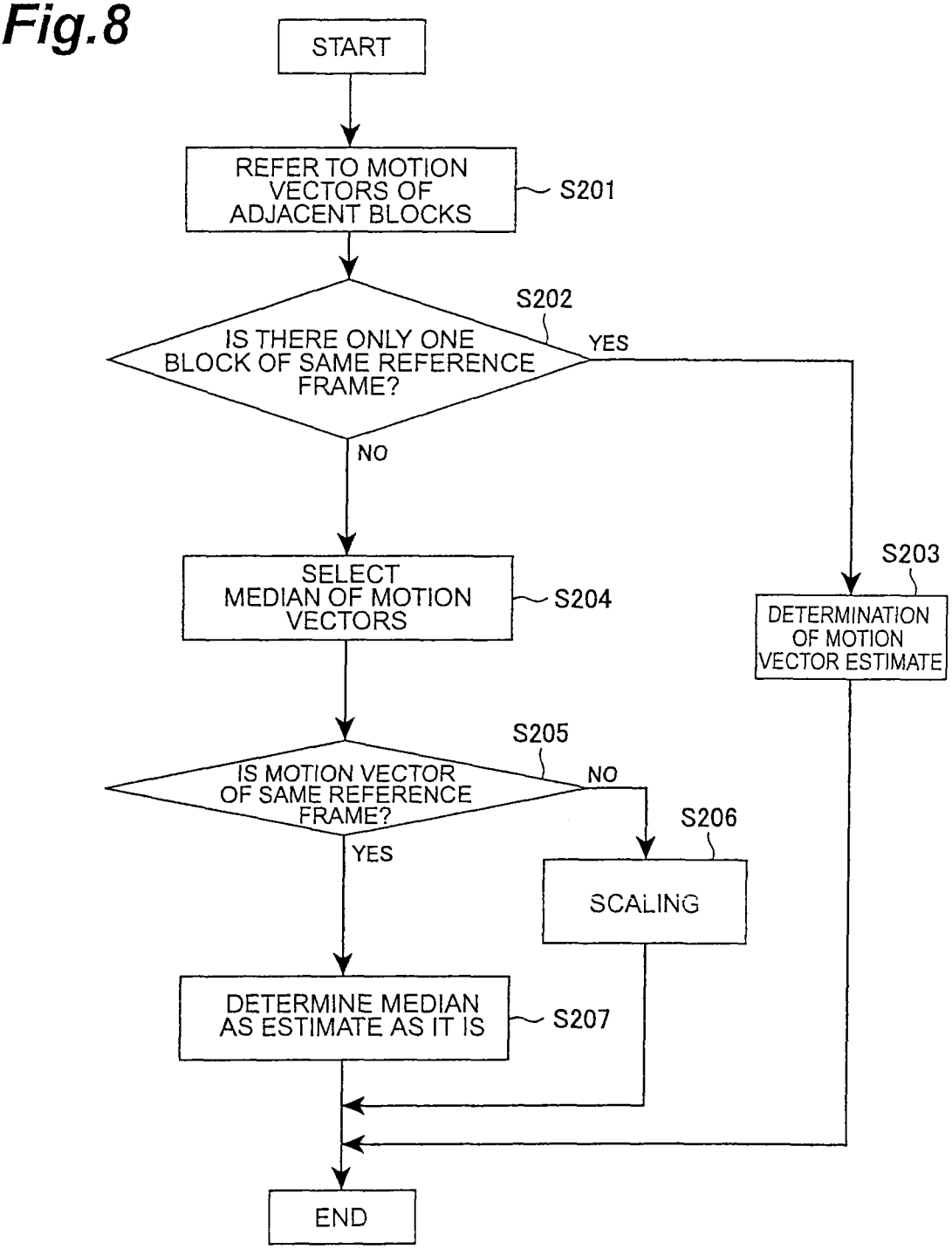
FIG. 8 is a flowchart showing the operation of a motion vector predicting part in a second embodiment.

FIG. 8 is a flowchart showing the operation in the calculation of the motion vector estimate by the motion vector predictor 204 in the present embodiment.

First, the motion vector predictor 204 refers to motion vectors and reference frame image numbers of blocks (A, B, and C) adjacent to the predetermined block (E) as a coding target, included in the reference frame image signal (step S201).

Then the motion vector predictor 204 determines whether only one of the reference frame numbers of the adjacent blocks (A, B, C) is equal to the reference frame number of the block (E) (step S202). When only one of the reference frame numbers of the adjacent blocks (A, B, C) is equal to the reference frame number of the block (E) (step S202: YES), values of the motion vector of the adjacent block having the equal reference frame number are determined to be a motion vector estimate of the block (E) (step S203). When it is not the case that only one of the reference frame numbers of the adjacent blocks (A, B, C) is equal to the reference frame number of block (E) (step S202: NO), the processing is transferred to step S204.

Subsequently, based on the motion vectors of the respective adjacent blocks (A, B, C), the motion vector predictor 204 selects an optimum motion vector for a motion vector estimate, without performing the scaling on the basis of the reference frame (target reference frame image) used for detection of the motion vector of the coding target block (E) (step S204). A method of selecting an optimum motion vector for a motion vector estimate can be a method of selecting an intermediate value out of the motion vectors of the blocks (A, B, C) adjacent to the coding target block (E) as to each of the x, y components, as in Embodiment 1.

After the motion vector selection, it is determined whether each of motion vectors selected as x, y components optimal for the motion vector estimate of the coding target block (E) is one motion compensated using the reference frame image of the same as the reference frame image number used for detection of the motion vector of the block (E) (step S205). When each motion vector selected is not one motion compensated using the same reference frame image as the reference frame image used for detection of the motion vector of the coding target block (E) (step S205: NO), the length of the x or y component of the motion vector is scaled so as to meet the same reference frame condition for the coding target block (E) (step S206). The scaling method is, as in Embodiment 1, to modify the length of the selected motion vector of the adjacent block on the basis of the temporal distance from the current frame (target frame image) to the reference frame (target reference frame image) of the coding target block and adopt the x component or the y component thereof as a motion vector estimate.

On the other hand, when each motion vector selected is one motion compensated using the same reference frame image as the reference frame image used for detection of the motion vector of the coding target block (E) (step S205: YES), the x component or the y component of the motion vector selected is determined to be a motion vector estimate as it is (step S207).

In the moving picture encoding apparatus 10 and moving picture decoding apparatus 30 of the second embodiment described above, the motion vector predictor 204 and 401 first determine the optimum predicted motion vector based on the motion vectors of the adjacent blocks and thereafter corrects to scale the determined optimum predicted motion vector on the basis of the time difference between the frame image referred to for detecting the motion vector of the target block and the frame image as a coding target, whereby it is feasible to further decrease the difference between the actual motion vector of the target region and the optimum predicted motion vector and, at the same time, it becomes feasible to reduce the processing time for prediction of the motion vector.

In the moving picture encoding apparatus 10 and moving picture decoding apparatus 30 of the first embodiment and the second embodiment described above, the medians were selected out of the motion vectors of the adjacent blocks before scaling or after scaling, and determined as a motion vector estimate, but this may be modified to determine the motion vector estimate (PMVxE, PMVyE) in a manner as described below.

Namely, in the first embodiment, where the x components of the respective motion vectors after scaling satisfy condition 1: |MVxA'−MVxB'|<|MVxB'−MVxC'|, PMVxE=MVxA' is determined. Where above condition 1 is not satisfied, PMVxE=MVxB' is determined. Likewise, where the y components of the respective motion vectors after scaling satisfy condition 2: |MVyA'−MVyB'|<|MVyB'−MVyC'|, PMVyE=MVyA' is determined. Where above condition 2 is not met, PMVyE=MVyB' is determined. In the second embodiment, where the x components of the respective motion vectors before scaling satisfy condition 1: |MVxA−MVxB|<|MVxB−MVxC|, PMVxE=MVxA is determined. Where above condition 1 is not satisfied, PMVxE=MVxB is determined. Similarly, where the y components of the respective motion vectors before scaling satisfy condition 2: |MVyA−MVyB|<|MVyB−MVyC|, PMVyE=MVyA is determined. Where above condition 2 is not satisfied, PMVyE=MVyB is determined. Thereafter, the motion vector estimate determined is scaled.

Figure 9A:
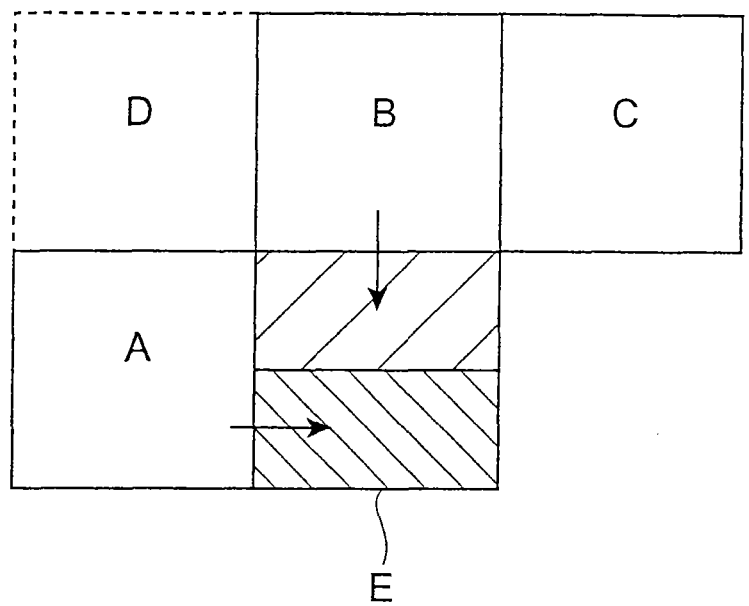
FIG. 9A is an illustration showing an example of divided blocks for prediction of motion vector.
Figure 9B:
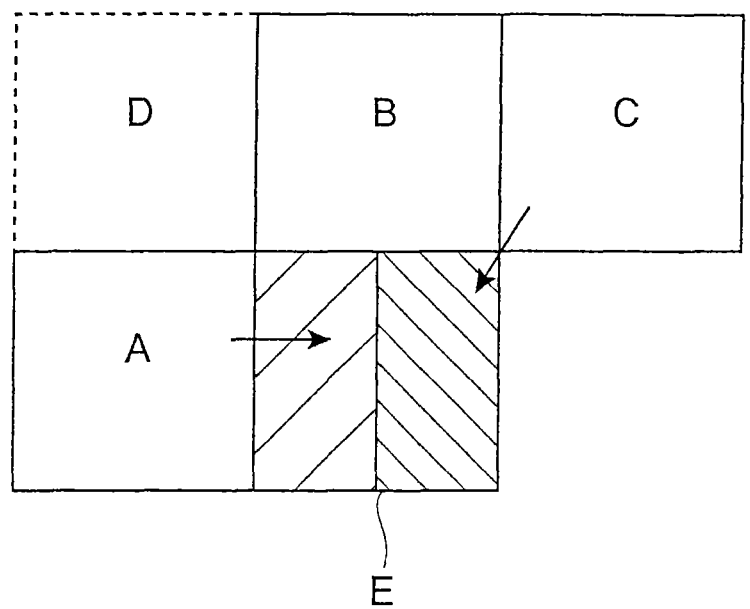
FIG. 9B is an illustration showing another example of divided blocks for prediction of motion vector.

Furthermore, the motion vector estimate may also be determined by a method as described below. Namely, locations of blocks to be used for an estimate of a motion vector are uniquely determined according to a segmentation method of a predetermined block as a coding target or the like, and motion vectors of the blocks are always selected. FIGS. 9A and 9B are illustrations showing examples of segmented blocks for prediction of motion vectors. In the example of FIG. 9A, where the prediction mode is one of segmenting a coding target block E into two regions of 16 pixels×8 lines, a motion vector of block B is determined as a motion vector estimate for the upper region, and a motion vector of block A for the lower region. In the example of FIG. 9B, where the prediction mode is one of segmenting the block E into two regions of 8 pixels×16 lines, a motion vector of block A is determined as a motion vector estimate for the left region, and a motion vector of block C for the right region. The locations of the motion vectors selected for the segmental regions in each of the above prediction modes are just an example, and a motion vector at any location can be determined as a motion vector estimate for a coding target block.

The moving picture encoding apparatus 10 and moving picture decoding apparatus 30 in the first embodiment and the second embodiment described above used the motion vectors of the adjacent blocks (A, B, C), for determining the motion vector estimate of the coding target block (E), as shown in FIG. 5, but the number of adjacent blocks and relative locations thereof to the block (E) may be modified as occasion may demand.

In the moving picture encoding apparatus and moving picture decoding apparatus of the present invention, as described above, the motion vector predicting means corrects to scale the motion vector of the adjacent region on the basis of the time difference between the frame image referred to for detecting the motion vector of the target region and the frame image of the coding target and predicts the optimum predicted motion vector based on the motion vector of the adjacent region; therefore, the predicted motion vector is determined in consideration of temporal continuity of motion, whereby it is feasible to further decrease the difference between the actual motion vector of the target region and the predicted motion vector. By this, the present invention successfully provided the moving picture encoding apparatus and moving picture decoding apparatus capable of increasing the efficiency of information compression in encoding and decoding.

What is claimed is:

1. A moving picture decoding apparatus for dividing a frame image as a decoding target in a moving picture signal consisting of a temporal series of frame image signals, into a plurality of target regions, and utilizing difference information between a predicted motion vector and motion vectors for the respective target regions detected with reference to a plurality of frame images different from the frame image as the decoding target, to perform decoding based on motion compensation, the moving picture decoding apparatus comprising:
   circuitry configured to
   select one predicted motion vector from among motion vectors of adjacent regions adjacent to a target region; and
   after selecting the one predicted motion vector, correct a scale of the selected predicted motion vector based on a temporal relation among
      (i) an adjacent reference frame image referred for detecting a motion vector of the adjacent region,
      (ii) a target reference frame image used for detection of the motion vector of the target region, and
      (iii) a target frame image being the frame image as the decoding target,
   wherein at least two of the adjacent regions adjacent to the target region refer respectively to two different reference frame images for detecting the motion vectors of the adjacent regions.

2. A moving picture decoding method of dividing a frame image as a decoding target in a moving picture signal consisting of a temporal series of frame image signals, into a plurality of target regions, and utilizing difference information between a predicted motion vector and motion vectors for the respective target regions detected with reference to a plurality of frame images different from the frame image as the decoding target, to perform decoding based on motion compensation, the moving picture decoding method comprising:
   selecting one predicted motion vector from among motion vectors of adjacent regions adjacent to a target region; and
   after the selecting the one predicted motion vector, correcting a scale of the selected predicted motion vector based on a temporal relation among
      (i) an adjacent reference frame image referred for detecting a motion vector of the adjacent region,
      (ii) a target reference frame image used for detection of the motion vector of the target region, and
      (iii) a target frame image being the frame image as the decoding target,
   wherein at least two of the adjacent regions adjacent to the target region refer respectively to two different reference frame images for detecting the motion vectors of the adjacent regions.

* * * * *